(12) United States Patent
Max et al.

(10) Patent No.: US 11,441,908 B2
(45) Date of Patent: Sep. 13, 2022

(54) METHOD FOR DETERMINING A DESTINATION DIFFERENT FROM AN INTENDED LOCATION, SYSTEM, AND MOTOR VEHICLE EQUIPPED WITH A SYSTEM

(71) Applicant: Volkswagen Aktiengesellschaft, Wolfsburg (DE)

(72) Inventors: Stephan Max, Gifhorn (DE); Thorben Günzel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 356 days.

(21) Appl. No.: 16/631,547

(22) PCT Filed: May 28, 2018

(86) PCT No.: PCT/EP2018/063870
§ 371 (c)(1),
(2) Date: Jan. 16, 2020

(87) PCT Pub. No.: WO2019/015834
PCT Pub. Date: Jan. 24, 2019

(65) Prior Publication Data
US 2020/0208990 A1 Jul. 2, 2020

(30) Foreign Application Priority Data
Jul. 18, 2017 (DE) .................... 10 2017 212 263.3

(51) Int. Cl.
*G01C 21/26* (2006.01)
*G08G 1/01* (2006.01)
*G08G 1/14* (2006.01)

(52) U.S. Cl.
CPC .......... *G01C 21/26* (2013.01); *G08G 1/0112* (2013.01); *G08G 1/0116* (2013.01); *G08G 1/14* (2013.01)

(58) Field of Classification Search
CPC .... G01C 21/26; G08G 1/0112; G08G 1/0116; G08G 1/14
(Continued)

(56) References Cited

U.S. PATENT DOCUMENTS

2012/0200430 A1* 8/2012 Spahl .................... G08G 1/143
340/932.2
2013/0265174 A1 10/2013 Scofield et al. .......... 340/932.2
(Continued)

FOREIGN PATENT DOCUMENTS

DE  102009054292 A1  8/2011  ............... G08G 1/14
DE  102011003772 A1  8/2012  ............. G01C 21/26
(Continued)

OTHER PUBLICATIONS

German Office Action, Application No. 102017212263.3, 6 pages, dated Jan. 11, 2018.
(Continued)

*Primary Examiner* — Peter D Nolan
*Assistant Examiner* — Luke Huynh
(74) *Attorney, Agent, or Firm* — Slayden Grubert Beard PLLC (57) ABSTRACT

The invention relates to a method for determining a destination for a motor vehicle that is different from an intended location, comprising the following steps: specifying an intended location; determining a usage rate at the intended location by means of a computing apparatus on the basis of data provided on the intended location; determining a plurality of possible alternative destinations different from the intended location on the basis of the data provided on the intended location if the usage rate exceeds a predefined usage rate threshold value; determining a predicted usage rate at the possible alternative destinations by means of the computing apparatus on the basis of data provided on the possible alternative destinations; and selecting a destination from the plurality of possible alternative destinations while taking into consideration the predicted usage rate at the alternative destinations.

20 Claims, 1 Drawing Sheet

(58) Field of Classification Search
 USPC .......................................................... 701/423
 See application file for complete search history.

(56) References Cited

U.S. PATENT DOCUMENTS

2014/0058711 A1* 2/2014 Scofield ................. G08G 1/143
 703/6
2014/0309921 A1* 10/2014 Ricci .................... A61B 5/6808
 701/400

FOREIGN PATENT DOCUMENTS

| | | | | |
|---|---|---|---|---|
| DE | 102013019262 A1 | | 5/2015 | ............. G01C 21/34 |
| DE | 102014214758 A1 | * | 1/2016 | ............. G01C 21/34 |
| DE | 102014214758 A1 | | 1/2016 | ............. G01C 21/34 |
| DE | 102015008174 A1 | | 12/2016 | ............. G01C 21/34 |
| DE | 102017212263 A1 | | 1/2019 | ............. B60W 40/02 |
| EP | 1455321 A2 | | 9/2004 | ............. G01C 21/34 |
| WO | 2019/015834 A1 | | 1/2019 | ............. G01C 21/36 |

OTHER PUBLICATIONS

International Search Report and Written Opinion, Application No. PCT/EP2018/063870, 7 pages, dated Sep. 6, 2018.

* cited by examiner

METHOD FOR DETERMINING A DESTINATION DIFFERENT FROM AN INTENDED LOCATION, SYSTEM, AND MOTOR VEHICLE EQUIPPED WITH A SYSTEM

CROSS-REFERENCE TO RELATED APPLICATIONS

This application claims priority to German Patent Application No. DE 10 2017 212 263.3, filed on Jul. 18, 2017 with the German Patent and Trademark Office. The contents of the aforesaid patent application are incorporated herein for all purposes.

TECHNICAL FIELD

The invention relates to a method for determining a destination for a motor vehicle that is different from an intended location. The invention also relates to a system for determining a destination for a motor vehicle that is different from an intended location, and to a motor vehicle equipped with a system.

BACKGROUND

Navigation devices that are configured to calculate an alternative route to an already determined route of the motor vehicle from a point of departure to a destination if, for example, there is a traffic jam or other traffic obstacle on the already determined route are known from the general prior art.

Based on this principle, DE 10 2015 008 174 A1, for example, describes a method for providing an alternative travel route for a motor vehicle. In this method, a vehicle-external processing unit receives a travel route signal in each case from a navigation apparatus of the motor vehicle and a navigation apparatus of at least one other motor vehicle, which signal describes the planned travel route and a travel destination of the motor vehicle and the at least one other motor vehicle. Using the received travel route signals, a geographical sector in which the relevant planned travel destination is located is determined. The processing apparatus is configured to create a digital model for the geographical sector based on all received travel route signals and to predict a volume of traffic within the geographical sector. Using the predicted volume of traffic, the processing apparatus determines the alternative travel route and transmits same to the navigation apparatus of the motor vehicle.

A navigation system is described in US 2014/0309921 A1. The navigation system is configured to guide a user to a destination based on user profile data and a driving history of the user or of another user. The navigation system comprises a motor vehicle control system that is configured to determine the route to the destination. Furthermore, the motor vehicle control system is configured to determine a volume of activity at the destination. Finally, the motor vehicle control system is configured to determine an alternative route to the destination if this is necessary based on the volume of activity at the destination. In order to detect a volume of activity, in particular a person in the surroundings of the motor vehicle, DE 10 2012 005 396 A1, for example, describes a method for the recording of data on a vehicle-external person by the motor vehicle.

The disadvantage of navigation systems of this kind is that although they determine an alternative route to the destination, they do not provide more information on the current and/or future events or the current and/or future volume of activity at the destination. If there is a high volume of traffic at the desired destination, it will for example be difficult for the driver to find a parking space at this destination.

Instead of calculating an alternative route on the basis of predefined traffic conditions on the planned route, it is known from EP 1 455 321 A2 to determine whether or not it is possible to keep to the planned arrival time based on location data, the planned arrival time and other data. In this case, too, there arises the problem of no information being provided on the current and/or future volume of activity at the destination to which the driver of the motor vehicle must adapt, even if it is not possible to keep to the arrival time.

SUMMARY

An object thus exists to provide an improved method and system for determining a destination for a motor vehicle such that said destination is particularly efficient for a user, for example in terms of time.

The object is solved by a method for determining a destination for a motor vehicle that is different from an intended location and by a system for determining a destination for a motor vehicle that is different from the intended location, said method and system having the features of the independent claims. Some embodiments with useful and nontrivial developments of the invention are presented in the dependent claims.

DESCRIPTION

In one aspect a method for determining a destination for a motor vehicle that is different from an intended location is provided. In the method for determining a destination for a motor vehicle that is different from an intended location, an intended location is firstly specified. For example, the intended location may be specified by means of a user of the motor vehicle. The user of the motor vehicle may thereby enter the intended location into a navigation system or navigation device of the motor vehicle, in particular via an input apparatus. Alternatively, a driving behavior of the driver or a driving history may be analyzed and evaluated by means of a computing apparatus in order to specify the intended location. The intended location can be determined by means of the computing apparatus on the basis of the driving behavior of the driver or the driving history, which may be stored in the computing apparatus. "Intended location" should in particular be understood to mean a location or geographical position to which the driver of the motor vehicle would initially like to be guided or navigated, in particular proceeding from a point of departure of the motor vehicle. The intended location may also be referred to as the point of interest (POI for short). Once the intended location has been specified, the computing apparatus can be configured to determine a route to the intended location and/or an arrival time at the intended location.

In another method step, a usage rate at the intended location is determined by means of a computing apparatus on the basis of data provided on the intended location. In some embodiments, the usage rate at the intended location may be a predicted usage rate at the intended location and/or a current usage rate at the intended location. In other words, the current usage rate and/or the predicted usage rate at the intended location may for example be determined as the usage rate at the intended location. "Data" should, e.g., be understood in this case to mean information and/or predefined values and/or details at or on the intended location. The data on the intended location may also be referred to as swarm data. "Usage rate" should in particular be understood to mean a volume of activity, such as a volume of traffic, and/or a number of people or motor vehicles at the intended location. In other words, in this method step, it can be determined how much is going on at the intended location.

In some embodiments, the data provided on the intended location can be provided by at least one other motor vehicle or a plurality of other motor vehicles. For example, the at least one other motor vehicle may already be at the intended location and transmit data on the intended location to the computing apparatus. In order to determine the data, the at least one motor vehicle may for example comprise a detection apparatus, for example a camera and/or one or more sensors, which are directed to the surroundings of the motor vehicle. The detection apparatus may be configured to detect people and/or objects in the surroundings of the motor vehicle. Additionally or alternatively, the data provided on the intended location may be provided by at least one detection apparatus at the intended location itself. Therefore, the detection apparatus may be a parking lot sensor of a parking garage or parking lot at the intended location and transmit information on parking lot occupancy as data to the computing apparatus. Additionally or alternatively, the data provided by the motor vehicles and/or by the detection apparatus at the intended location, for example parking data and/or navigation targets and/or traffic flow data, may be transmitted to the computing apparatus and collected or stored therein. Additionally or alternatively, the computing apparatus may be configured to evaluate the received data. In other words, the computing apparatus may be designed to analyze swarm data. The computing apparatus may therefore be configured, for example, to determine the occupancy of parking lots at the intended location and/or a flow of traffic or volume of traffic at the intended location.

In another method step, a plurality of possible alternative destinations different from the intended location are determined on the basis of the data provided on the intended location if the usage rate exceeds a predefined usage rate threshold value. In other words, the computing apparatus may be configured to change the intended location due to the determined usage rate at the intended location. For example, the possible alternative destinations are locations or places of the same category as the specified intended location. In other words, the possible alternative destinations may be alternative points of interest to the specified point of interest. If, for example, a swimming pool or the geographical position or coordinates of the swimming pool is specified as the intended location by the user, swimming pools or the geographical position or coordinates of the swimming pools are also determined or identified as possible alternative destinations.

"Usage rate threshold value" is, e.g., a limit value or maximum value for the usage rate. If this "usage rate threshold value" is exceeded, i.e. the usage rate at the intended location is greater than the usage rate threshold value, the possible alternative destinations different from the intended location are determined. This produces the benefit that a usage rate of intended locations is determined and said usage rate is taken into consideration for the navigation.

Subsequently, the computing apparatus determines a predicted usage rate at the possible destinations on the basis of the data provided on the possible destinations. The data on the destination may also be referred to as swarm data. "Predicted usage rate" should in particular be understood to mean a likely or probable or future usage rate at the plurality of possible alternative destinations. In some embodiments, the data provided on the possible alternative destinations may be determined in the same way as the data provided on the intended location. Beneficially, the data provided on the destination can be provided by at least one other motor vehicle or a plurality of other motor vehicles. For example, navigation targets of the other motor vehicles that correspond to the intended location may be taken into consideration. In other words, the other motor vehicles may transmit the navigation targets that match the destinations as navigation targets to the computing apparatus. Additionally or alternatively, the at least one other motor vehicle may already be at one of the destinations and transmit data on the relevant destination to the computing apparatus. In order to determine the data, the at least one other motor vehicle may for example comprise a detection apparatus, for example a camera and/or one or more sensors, which are directed to the surroundings of the motor vehicle. The detection apparatus may be configured to detect people and/or objects in the surroundings of the motor vehicle. Additionally or alternatively, the data provided on the possible alternative destinations may be provided in each case by a detection apparatus at the relevant possible alternative destination itself. Therefore, the detection apparatus may be a parking lot sensor of a parking garage or parking lot at the intended location and transmit information on parking lot occupancy as data to the computing apparatus. Additionally or alternatively, the data provided by the at least one other motor vehicle and/or by the detection apparatus at the relevant destination, for example parking data and/or navigation targets and/or traffic flow data, may be transmitted to the computing apparatus and collected or stored therein. Additionally or alternatively, the computing apparatus may be configured to evaluate the received data. In other words, the computing apparatus may be designed to analyze swarm data. The computing apparatus may therefore be configured, for example, to determine the occupancy of parking lots at the intended location and/or a flow of traffic and/or volume of traffic at the respective possible alternative destinations.

Finally, a destination is selected from the plurality of possible alternative destinations while taking into consideration the predicted usage rate at the destinations. For example, the predicted usage rate at the respective possible alternative destinations may be output to the driver by means of an output apparatus, for example on a display. This way, the driver may select the desired destination to be specified themselves. Alternatively, the computing apparatus may also be configured to select the destination according to a predefined criterion or a predefined condition, which may for example be defined in advance by the driver. The computing apparatus may for example be configured to select the destination with the lowest predicted usage rate.

For example, a family wants to drive to a swimming pool on a warm summer's day. The driver therefore selects a preferred swimming pool as the intended location in the navigation system or navigation device. The, in particular current, usage rate of the swimming pools in the surrounding area is determined by means of the swarm data, which are provided for example by other motor vehicles and/or by a detection apparatus at the intended location.

The preferred swimming pool (intended location) is shown to currently be relatively empty compared with the other swimming pools (possible alternative destinations) in the surrounding area. However, it is known from historic data that people often stay for a very long time at this swimming pool and that the swimming pool will become even fuller throughout the course of the day. In addition, a majority of the moving swarm (other motor vehicles with the same navigation targets as the intended location) is on the way to this swimming pool. An alternative swimming pool with a lower usage rate than the swimming pool selected as the intended location is proposed or output to the driver. In the process, it is taken into consideration that some of the moving swarm have also decided to head to the alternative swimming pool (the determined destination).

This produces the benefit that a destination that is particularly efficient for the user, in particular in terms of time, is determined. Moreover, the destination is determined in a particularly reliable manner and in consideration of the customer's or driver's wishes. The driver or user is therefore also provided with particularly reliable support in the search for or selection of a suitable destination.

In an embodiment, the data provided on the intended location comprise information on the occupancy of parking lots at the intended location. In order to determine an occupancy of parking lots at the intended location, at least one other motor vehicle can transmit to the computing apparatus the information that it is moving to or is in the parking lot. For example, at least one other motor vehicle, in particular an assistance system of the other motor vehicle that assists with a parking and pull-out procedure of the at least one other motor vehicle, may transmit GPS data and/or time information to the computing apparatus. Additionally or alternatively in some embodiments, in order to determine the occupancy of parking lots at the intended location, the at least one other motor vehicle, which has environment sensors, may detect other motor vehicles, for example in the parking lot and/or at the side of the road, or free parking spaces, in particular including GPS data and/or time information, and transmit said data to the computing apparatus. Said data may be collected and evaluated by the computing apparatus in order to determine an occupancy of the parking lots or an occupancy probability for the parking lots. In order to be able to determine the occupancy probability for the parking lots, navigation targets of the at least one other motor vehicle or plurality of other motor vehicles can be compared with the intended location and, this way, a probability as to where the driver or the motor vehicle will park at the intended location can be established. Additionally or alternatively in some embodiments, the computing apparatus may be configured to assign the parking lots to the intended location in order to draw a conclusion on the usage rate at the intended location based on the occupancy of the parking lots. For the intended location, the usage rate at the parking lots may be stored in an occupancy map of the computing apparatus, said map in particular indicating when and how the parking lots are occupied.

Additionally or alternatively in some embodiments, the data provided on the intended location may comprise a number of people at the intended location. Depending on the intended location, it may be relevant to determine the number of people and/or objects moving in the surrounding area of the intended location and to send said information to the computing apparatus. For example, it is probable that the intended location will be used at a higher rate the more people there are moving to the intended location. The number of people and/or objects at the intended location may for example be determined by means of a detection apparatus of the at least one other motor vehicle, which is at the intended location. For example, the at least one other motor vehicle may comprise a camera and/or a radar configured to carry out object recognition as the detection apparatus.

Additionally or alternatively in some embodiments, the data provided on the intended location may comprise navigation targets of other motor vehicles that correspond to the intended location. The computing apparatus can therefore be configured, for example, to determine which of the other motor vehicles have specified the intended location as the navigation target.

Additionally or alternatively in some embodiments, the data provided on the intended location may comprise information about an event at the intended location. The information about the event may for example comprise a date and/or time and/or the precise location of the event and/or a number of event tickets sold.

In addition to determining the usage rate at the intended location based on the swarm data, the present discussion is based on the knowledge that assessment with regard to the up-to-dateness of the data is of vital importance. For this reason, according to some embodiments, a time of the data provided on the intended location is taken into consideration during determination of the usage rate at the intended location and/or a time of the data provided on the destinations is taken into consideration when determining the usage rate at the destinations. For example, all data transmitted to the computing apparatus may be provided with time information and/or GPS data. Additionally or alternatively and in some embodiments, the data received by the computing apparatus may be discarded after a predefined period of time, in particular depending on the type of input data. This way, it is possible to determine the current usage rate at the intended location and/or the destination in a particularly reliable manner.

According to some embodiments, the usage rate at the intended location is determined by means of movement trends, in particular of other motor vehicles, to the intended location and/or by means of historic data and/or by means of a reaction of other motor vehicles in the event of the other motor vehicles being guided to the intended location along alternative routes. "Movement trends" should, e.g., be understood as movements or planned routes of the other motor vehicles to the intended location. For example, the computing apparatus of the motor vehicle may receive the destinations of the other motor vehicles that are identical to the intended location from a vehicle-external unit and evaluate said destinations. In other words, a movement or flow of other motor vehicles to the intended location may be taken into consideration during determination of the usage rate at the intended location. "Historic data" may, e.g., be understood that a predefined time or a predefined point in time is taken into consideration with regard to when and/or how many motor vehicles or objects have been or will be at the intended location at a predefined time. Additionally or alternatively and in some embodiments, a reaction of other motor vehicles may also be taken into consideration. In other words navigation data of other motor vehicles that are guided to the intended location along an alternative route or are rerouted to the intended location are taken into account. In other words, a reaction of a swarm of other motor vehicles toward the intended location can be taken into consideration.

Beneficially, the predicted usage rate at the possible alternative destinations may be determined by means of movement trends, in particular of other motor vehicles, to the possible alternative destinations and/or by means of historic data and/or by means of a reaction of other motor vehicles in the event of the other motor vehicles being guided to the possible alternative destinations along alternative routes. "Movement trends" may, e.g., be understood to mean movements or planned routes of the other motor vehicles to the possible alternative destinations. For example, the computing apparatus of the motor vehicle may receive the destinations of the other motor vehicles that are identical to the possible alternative destinations from a vehicle-external unit and evaluate said destinations. In other words, a movement or flow of other motor vehicles to the respective possible alternative destinations may be taken into consideration during determination of the usage rate at the respective possible alternative destinations. "Historic data" may, e.g., be understood to mean that a predefined time or a predefined point in time is taken into consideration with regard to when and/or how many motor vehicles or objects have been or will be at the possible alternative destinations at a predefined time. Additionally or alternatively and in some embodiments, a reaction of other motor vehicles may also be taken into consideration. In other words, navigation data of other motor vehicles that are guided to the possible alternative destinations along an alternative route or are rerouted to the possible alternative destinations are taken into account. In other words, a reaction of a swarm of other motor vehicles toward the possible alternative destinations may be taken into consideration.

In some embodiments, the possible alternative destinations are determined in consideration of a distance comparable to that to the intended location proceeding from a point of departure of the motor vehicle and/or in consideration of a history of destinations stored in the computing apparatus and/or are determined based on preferences and/or the possible alternative destinations located within a predefined surrounding area of the intended location are determined. In other words, the computing apparatus may be configured to output and propose alternatives to the intended location. Said alternatives, i.e., possible alternative destinations, may be determined on the basis of the history, i.e., history data of the destinations driven to by the motor vehicle up to this point, and/or on the basis of alternative destinations in the surrounding area of the intended location and/or alternative destinations at a comparable driving distance. Additionally or alternatively and in some embodiments, said alternatives may also be determined based on preferences, such as of a driver of the motor vehicle. Navigation data of the motor vehicle may for example be evaluated in order to determine the preferences of the driver. In the process, the locations which the driver visits most frequently or to which the driver has driven most frequently can be determined. A time may for example also be taken into consideration when determining or identifying the preferences of the driver. Additionally, the determined possible alternative destinations may be sorted, in particular in ascending or descending order, according to the usage rate at the destinations by means of the computing apparatus.

Additionally or alternatively and in some embodiments, the computing apparatus may take into consideration predilections, such as predefined locations or places of the driver or user, in order to determine the plurality of possible alternative destinations. For this purpose, the computing apparatus may for example be configured to evaluate movement data of the driver or user. By way of example, the computing apparatus can recognize and store the following predilections of the driver: if the driver very frequently drives to popular café s, i.e., a predefined intended location, how long they stop at the predefined intended location, or if they drive past empty café s despite the fact that they visit a café immediately afterward. If these predilections are known as specifications, the computing apparatus may be configured to automatically suggest alternative destinations. Additionally or alternatively and in some embodiments, the driver may specify or alter these assumptions of the computing apparatus.

The present disclosure also relates to a system for determining a destination for a motor vehicle that is different from an intended location. The system comprises a computing apparatus, which is configured to determine a usage rate at a specified intended location on the basis of data provided on the intended location, the computing apparatus further being configured to determine a plurality of possible alternative destinations different from the intended location on the basis of the data provided on the intended location if the usage rate exceeds a predefined usage rate threshold value. Furthermore, the computing apparatus is configured to determine a predicted usage rate at the possible alternative destinations on the basis of data provided on the possible alternative destinations and to select a destination from the plurality of possible alternative destinations while taking into consideration the predicted usage rate at the possible alternative destinations.

In some embodiments, the data provided on the intended location and/or on the destinations are provided by means of a detection apparatus of at least one other motor vehicle. The detection apparatus of the at least one motor vehicle may comprise a navigation system and/or a camera and/or at least one environment sensor. Additionally or alternatively and in some embodiments, it may be possible for the data provided on the intended location and/or the destinations to be provided by means of a detection apparatus at the intended location and/or destination. The detection apparatus at the intended location and/or at the destinations may comprise a camera and/or an environment sensor and/or a parking lot occupancy sensor.

The present disclosure also relates to a motor vehicle equipped with the explained system. The motor vehicle may be designed as a car, in particular a passenger car. The system may for example be a navigation system or driver assistance system of the motor vehicle.

The present disclosure also encompasses embodiments of the system and the motor vehicle as discussed herein that have features which have been described in the preceding in conjunction with the method and the corresponding embodiments of the methods. For this reason, the corresponding embodiments of the system and of the motor vehicle are not described again.

Figure 1:
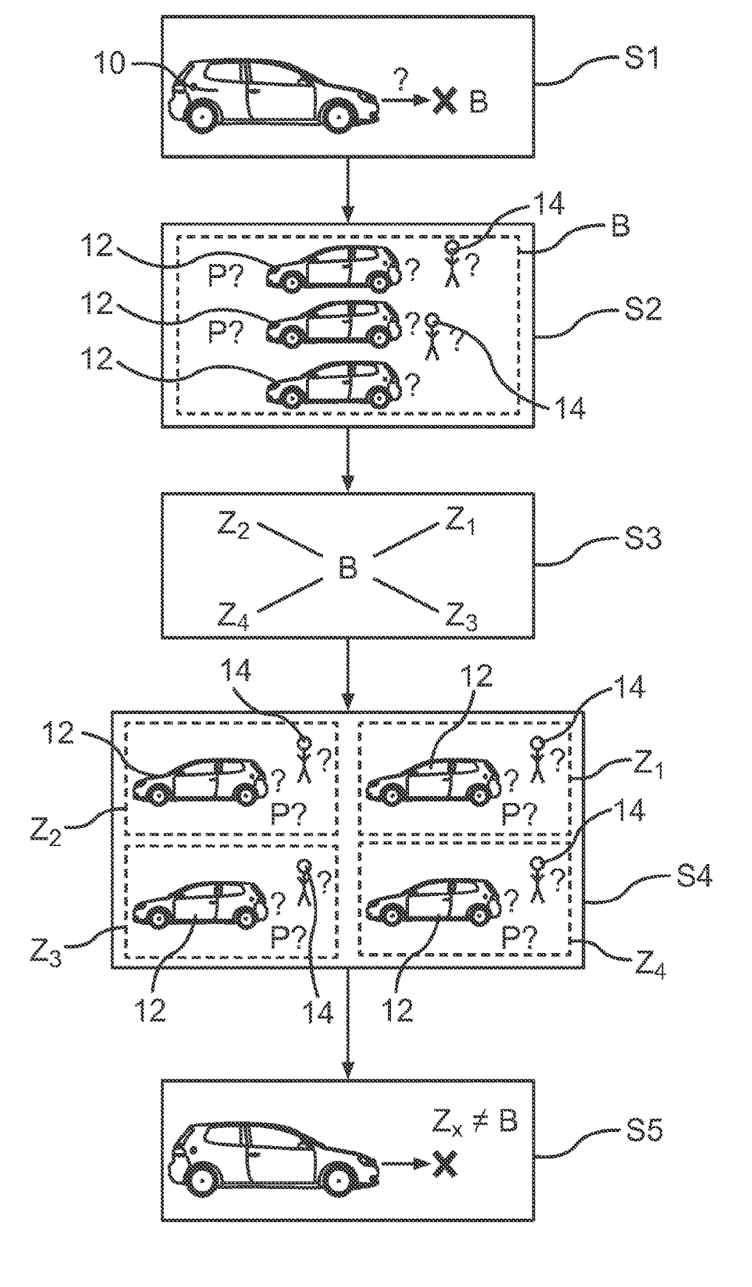
The single FIG. shows method steps of a method for determining a destination different from an intended location in a schematic flow diagram.

In the following, further exemplary embodiments are described in conjunction with the single FIG.

In a first method step S1, an intended location B is specified. The intended location B may be a point of interest (POI for short). Proceeding from a point of departure of the motor vehicle 10, a driver assistance system, for example a navigation system of the motor vehicle 10, may be configured to guide or navigate the motor vehicle 10 from the point of departure to the intended location B. The intended location B can be specified in two different ways. On the one hand, a driver of the motor vehicle 10 can input the intended location B, i.e. the navigation target, into the navigation system. On the other hand, a computing apparatus can be configured to analyze a driving behavior of the driver and determine how probable it is that the driver will drive to a particular destination. In other words, the computing apparatus can be configured to evaluate a driving history of the driver or motor vehicle 10 and determine and specify the intended location B on the basis of the driving history, i.e. history data. Additionally or alternatively and in some embodiments, the computing apparatus may be configured to display to the driver different destinations or preferences, determined for example from history data, of which the driver can select one. The computing apparatus may for example be configured to search for the intended locations to which the driver usually drives. The computing apparatus may be designed as a vehicle-internal unit, for example a control apparatus or electronic circuit. In some embodiments, the computing apparatus is part of a driver assistance system or the navigation system of the motor vehicle 10. Alternatively and in some embodiments, the computing apparatus may be designed as a vehicle-external unit, for example a server apparatus. Once the intended location B has been specified, the computing apparatus or the navigation system can be configured to determine an arrival time at the intended location B.

If the intended location B has been specified, the computing apparatus can be configured to calculate or determine an arrival time at the intended location, in particular on the basis of the determined route.

In a subsequent second method step S2, the computing apparatus is configured to determine a usage rate at the intended location B on the basis of data provided on the intended location. The arrival time at which the motor vehicle 10 would reach the intended location B may, e.g., be taken into consideration during determination of the usage rate at the intended location B. "Usage rate" may in this case for example be an occupancy rate or a volume of activity, such as a volume of traffic, or a number of people and/or motor vehicles and/or other objects at the intended location.

Parking lots P or parking garages at the intended location B may for example be used to determine the usage rate at the intended location B. The parking lots P may have a server apparatus that is configured to transmit data on the parking lots P to the computing apparatus. The parking lots P may for example comprise a detection apparatus. The detection apparatus may for example comprise parking lot occupancy sensors and/or a camera and/or an environment sensor. The detection apparatus may be configured to record data from parking and pull-out procedures of other motor vehicles 12 in the parking lots P and/or data on free and/or occupied parking spaces in the parking lots P and/or data from people 14 in the parking lots P. Furthermore, the detection apparatus may be configured to collect said data or to transmit or send said data directly to the computing apparatus.

Additionally or alternatively and in some embodiments, the usage rate at the intended location B may be determined with the help of the other motor vehicles 12 at the intended location B. For this purpose, the other motor vehicles 12 or at least one other motor vehicle 12 may comprise another detection apparatus. The other detection apparatus may for example comprise one or more environment sensors, such as a radar and/or a camera and/or an ultrasound sensor. The other detection apparatus may be configured to detect objects such as people in an area surrounding the other motor vehicle. Additionally or alternatively and in some embodiments, the other detection apparatus may be configured to detect motor vehicles in the parking lot P and/or free parking spaces in the parking lot P. Furthermore, the other detection apparatus may be configured to transmit the detected data to the computing apparatus.

Another additional or alternative embodiment for determining the usage rate at the intended location B consists in the computing apparatus being configured to detect navigation targets of the other motor vehicles 12 that correspond to the intended location B. The computing apparatus may therefore determine which of the other motor vehicles 12 are also moving to the intended location B.

The computing apparatus may in turn be configured to collect and/or store and/or evaluate said data as swarm data.

The present disclosure is based on the knowledge that there is not always the same amount of activity at the intended location B. Accordingly, the computing apparatus may be configured to filter data based on how up-to-date it is. For this purpose, a point in time of the data provided on the intended location B may for example be taken into consideration when determining the usage rate at the intended location B. The computing apparatus can determine a usage rate at the intended location B on the basis of a current point in time or a calculated arrival time of the motor vehicle 10 at the intended location B and on the basis of the data provided on the intended location B.

In a third method step S3, the computing apparatus determines a plurality of possible alternative destinations Z1, Z2, Z3, Z4 different from the intended location B on the basis of the data provided on the intended location B if the usage rate exceeds a predefined usage rate threshold value. In other words, the computing apparatus may be configured to change the intended location B due to the determined usage rate at the intended location B. For this purpose, a predefined value of a usage rate threshold value may for example be stored in the computing apparatus. If the detected usage rate at the intended location B exceeds the usage rate threshold value, the computing apparatus determines a plurality of possible alternative destinations Z1, Z2, Z3, Z4 different from the intended location B. These destinations Z1, Z2, Z3, Z4 may be locations of the same category as the intended location B. The plurality of destinations Z1, Z2, Z3, Z4 may for example be locations or points of interest that correspond to the intended location B. The possible alternative destinations Z1, Z2, Z3, Z4 may be determined in consideration of a distance comparable to that to the intended location B proceeding from a point of departure of the motor vehicle 10. For example, if a first café was selected as the intended location B, other café s that are at the same, i.e. a comparable, distance proceeding from the point of departure of the motor vehicle are identified as possible alternative destinations Z1, Z2, Z3, Z4. If, for example, the first café is 10 km from the point of departure of the motor vehicle 10, other café s at the same or a similar distance from the point of departure of the motor vehicle 10 can be determined as possible alternative destinations. Therefore, other café s at a distance of 10 km or at a distance of from 5 km to 15 km may for example be identified. Additionally or alternatively and in some embodiments, a tolerance, i.e. a permissible difference from the actual distance, may be taken into consideration when considering the distance.

Additionally or alternatively and in some embodiments, the possible alternative destinations Z1, Z2, Z3, Z4 may be determined while taking into consideration a history of destinations stored in the computing apparatus. For example, various destinations at which the driver has already been can be stored in the computing apparatus. Said destinations may be classified according to category and/or region. When determining the plurality of possible alternative destinations Z1, Z2, Z3, Z4, the computing apparatus can be configured to select destinations that have already been visited and that are comparable to the intended location B.

Additionally or alternatively and in some embodiments, the possible alternative destinations Z1, Z2, Z3, Z4 that are within a predefined surrounding area of the intended location B can be identified. In other words, the computing apparatus may for example also be configured to take into consideration the intended location B and/or a predefined radius around the intended location B when determining the plurality of possible alternative destinations Z1, Z2, Z3, Z4.

If the plurality of possible alternative destinations Z1, Z2, Z3, Z4 different from the intended location B have been determined, in a fourth method step S4, the computing apparatus is configured to determine a predicted usage rate at the possible alternative destinations Z1, Z2, Z3, Z4 on the basis of the data provided on the possible alternative destinations Z1, Z2, Z3, Z4. The predicted usage rate of the possible alternative destinations Z1, Z2, Z3, Z4 is made up of several factors. In this regard, the current usage rate at the respective possible alternative destinations Z1, Z2, Z3, Z4, which indicates how heavily the respective destinations are currently being frequented, must be taken into consideration. The current usage rate at the respective possible alternative destinations Z1, Z2, Z3, Z4 can be determined in a similar manner to the usage rate at the intended location B.

The current usage rate at the respective possible alternative destinations Z1, Z2, Z3, Z4 changes depending on people or motor vehicles or objects leaving the respective possible alternative destinations Z1, Z2, Z3, Z4 and on people or motor vehicles or objects arriving at the respective destinations Z1, Z2, Z3, Z4. These inflows and outflows can be estimated based on historic data. The basis for this approach, i.e., the estimation based on historic data, is to draw conclusions on the future from movements from the past. The average occupancy at the respective possible alternative destinations Z1, Z2, Z3, Z4 on a corresponding day of the week and/or a particular time can be determined and used as a prediction. This prediction can be improved with additional data, for example by determining weather conditions, outside temperature and/or school vacation periods. Information on events such as soccer world cup coverage or a concert in the surrounding area can be used to optimize the predictions. Another option for using the historic data is to determine the average length of stay at the respective destinations Z1, Z2, Z3, Z4. If it is known from historic data that the length of stay at the respective possible alternative destinations Z1, Z2, Z3, Z4 is on average 1 hour, for example, the number of people and/or motor vehicles and/or objects leaving the relevant destination of the plurality of possible alternative destinations Z1, Z2, Z3, Z4 per minute, for example, can be determined and used for the prediction.

Additionally or alternatively and in some embodiments, movement trends can be taken into consideration by evaluating the motor vehicles 12 currently moving to the plurality of possible alternative destinations Z1, Z2, Z3, Z4. In other words, navigation targets of the other motor vehicles 12 that correspond to the intended location may be taken into consideration. In the simplest case, the already described navigations targets, i.e., the possible destinations, can be used for this. In this case, the calculated arrival time is used in consideration of the location and/or traffic information of the motor vehicle 10.

In addition, a reaction of the swarm, i.e., of the other motor vehicles 12 moving to the respective destinations Z1, Z2, Z3, Z4, is taken into consideration when determining the usage rate at the destinations. It is hereby assumed that some of the other motor vehicles 12 among the swarm moving to an intended location B will alter their strategy intelligently and adapt same depending on the usage rate at the intended location B and/or relevant destination. The average number of people currently in the moving swarm can hereby also be taken into consideration. The plurality of possible alternative destinations Z1, Z2, Z3, Z4 can be proposed to the driver of the motor vehicle 10 by the computing apparatus based on the knowledge of the plurality of possible alternative destinations Z1, Z2, Z3, Z4, i.e., comparable POIs. As a result, the swarm, i.e. the other motor vehicles 12 moving to the respective other destinations Z1, Z2, Z3, Z4, is also influenced in a corresponding manner, which could alter the usage rate at the respective destinations Z1, Z2, Z3, Z4 and thus allow for a direct conclusion on the evaluation of the respective destinations Z1, Z2, Z3, Z4.

In a final fifth method step S5, a destination out of the plurality of possible alternative destinations Z1, Z2, Z3, Z4 is selected while taking into consideration the predicted usage rate at the possible alternative destinations Z1, Z2, Z3, Z4. This may for example be done by the driver or automatically by the computing apparatus. For example, the computing apparatus may be configured to select the destination having the lowest usage rate out of the plurality of possible alternative destinations Z1, Z2, Z3, Z4 as the destination. The relevant destination may also be selected according to predefined criteria, which may for example be specified by the driver.

If the destination is selected, the navigation is adapted. Instead of heading for the intended location B, the driver heads for the destination. In other words, the driver navigates to the destination instead of to the intended location B.

In the following, specific examples shall be described.

The driver enters their intended location B, i.e. destination of choice. The arrival time at the intended location B is calculated based on traffic information and the current location of the motor vehicle 10. The usage rate at the intended location B is determined according to the above-described method with the aid of the arrival time. If the usage rate at the intended location B exceeds a limit, alternative possible destinations Z1, Z2, Z3, Z4 are determined based on assigned alternatives, i.e. the plurality of possible alternative destinations Z1, Z2, Z3, Z4, and the predicted usage rate thereof. Said possible alternative destinations can then be proposed to the driver as alternatives or automatically carried over into the navigation.

A family wants to drive to a swimming pool on a warm summer's day. The driver therefore selects a preferred swimming pool in the navigation system. The current usage rate of the swimming pools in the surrounding area is determined using the swarm data. The preferred swimming pool is shown to currently be relatively empty compared with the other swimming pools in the surrounding area. However, it is known from historic data that people often stay for a very long time at this swimming pool and that the swimming pool will become even fuller throughout the course of the day. Moreover, the majority of the moving swarm is on the way to this swimming pool. An alternative swimming pool with a significantly lower usage rate is proposed to the driver. In the process, it is taken into consideration that some of the moving swarm have also decided to head to the alternative swimming pool. In addition, it is possible to show the driver the current and expected future occupancy of the destinations, i.e. the swimming pools, for example. This prediction can be displayed to the driver as a diagram. The driver can make their way directly to one of the respective destinations Z1, Z2, Z3, Z4 because occupancy is still low, for example. Alternatively, the driver can replan their route and drive to the destination at a later point in time, since although said destination is currently very busy, occupancy will drop within the next 2 hours, for example, according to the prediction. Furthermore, the navigation target, i.e., the destination, can automatically be optimized according to customer preferences in the case of multi-destination input, thus leading to an ideal journey.

Overall, the example shows how a method and a device for determining and drawing on usage rates at POIs can be implemented in a motor vehicle by means of the invention.

LIST OF REFERENCE NUMBERS

10 Motor vehicle
12 Other motor vehicle
14 Person
B Intended location
P Parking lots
S1 First method step
S2 Second method step
S3 Third method step
S4 Fourth method step
S5 Fifth method step
Z1 Destination
Z2 Destination
Z3 Destination
Z4 Destination

What is claimed is:

1. A method for controlling the travel of a motor vehicle to an alternative destination that is different from an intended location, the method comprising:
   identifying an intended location including a point of interest;
   determining a usage rate at the intended location using a computing apparatus on the basis of data provided on the intended location;
   determining a plurality of possible alternative destinations with a respective point of interest corresponding to but different from the intended location on the basis of the data provided on the intended location if the usage rate exceeds a predefined usage rate threshold value;
   determining a predicted usage rate at the possible alternative destinations using the computing apparatus on the basis of data provided on the possible alternative destinations;
   selecting the alternative destination from the plurality of possible alternative destinations while taking into consideration the predicted usage rate at the possible alternative destinations;
   automatically controlling the propulsion and navigation of the motor vehicle to the selected alternative destination.

2. The method of claim 1, wherein the data provided on the intended location are provided by one or more of one other motor vehicle and one detection apparatus at the intended location.

3. The method of claim 2, wherein one or more of a current usage rate and a predicted usage rate at the intended location is determined when determining the usage rate at the intended location.

4. The method of claim 2, wherein the data provided on the intended location comprise one or more of an occupancy of parking lots at the intended location, a number of people at the intended location, navigation targets of other motor vehicles that correspond to the intended location, and information about an event at the intended location.

5. The method of claim 2, wherein at least one datum selected from the group consisting of: a point in time of the data provided on the intended location, a point in time of the data provided on the possible alternative destinations, and an arrival time of the motor vehicle at the intended location or the destination is taken into consideration when determining the usage rates.

6. The method of claim 1, wherein one or more of a current usage rate and a predicted usage rate at the intended location is determined when determining the usage rate at the intended location.

7. The method of claim 6, wherein the data provided on the intended location comprise one or more of an occupancy of parking lots at the intended location, a number of people at the intended location, navigation targets of other motor vehicles that correspond to the intended location, and information about an event at the intended location.

8. The method of claim 6, wherein at least one datum selected from the group consisting of: a point in time of the data provided on the intended location, a point in time of the data provided on the possible alternative destinations, and an arrival time of the motor vehicle at the intended location or the destination is taken into consideration when determining the usage rates.

9. The method of claim 1, wherein the data provided on the intended location comprise one or more of an occupancy of parking lots at the intended location, a number of people at the intended location, navigation targets of other motor vehicles that correspond to the intended location, and information about an event at the intended location.

10. The method of claim 9, wherein at least one datum selected from the group consisting of: a point in time of the data provided on the intended location, a point in time of the data provided on the possible alternative destinations, and an arrival time of the motor vehicle at the intended location or the destination is taken into consideration when determining the usage rates.

11. The method of claim 1, wherein at least one datum selected from the group consisting of: a point in time of the data provided on the intended location, a point in time of the data provided on the possible alternative destinations, and an arrival time of the motor vehicle at the intended location or the destination is taken into consideration when determining the usage rates.

12. The method of claim 1, wherein determining the usage rate at the intended location and/or at the possible alternative destinations includes analyzing at least one datum selected from the group consisting of: planned travel of other motor vehicles to the intended location or the possible alternative destinations, historic data, and a reaction of other motor vehicles in the event of the other motor vehicles being guided to the intended location or the possible alternative destinations along alternative routes.

13. The method of claim 1, wherein the data provided on the possible alternative destinations are provided by one or more of one other motor vehicle and by at least one detection apparatus at the respective possible alternative destinations.

14. The method of claim 1, wherein determining the possible alternative destinations includes consideration of at least one datum selected from the group consisting of: a distance comparable to that to the intended location proceeding from a point of departure of the motor vehicle and/or in consideration of a history of destinations stored in the computing apparatus, preferences, and the possible alternative destinations located within a predefined surrounding area of the intended location.

15. The method of claim 1, wherein the possible alternative destinations are locations or places of the same category as the intended location.

16. A system for controlling a motor vehicle to drive to an alternative destination that is different from an intended location including a first point of interest, the system comprising:
- a computing apparatus configured to determine a usage rate at a specified intended location on the basis of data provided on the intended location; wherein the computing apparatus is further configured:
  - to determine a plurality of possible alternative destinations each with a respective point of interest corresponding to but different from the intended location on the basis of the data provided on the intended location if the usage rate exceeds a predefined usage rate threshold value;
  - to determine a predicted usage rate at the possible alternative destinations on the basis of data provided on the possible alternative destinations;
  - to select a destination from the plurality of possible alternative destinations while taking into consideration the predicted usage rate at the possible destinations; and
  - to control operation of the motor vehicle to drive to the alternative destination.

17. The system of claim 16, wherein the data provided on at least one of the intended location and the destination is provided by one or more of a detection apparatus of at least one other motor vehicle and a detection apparatus at the intended location or at the possible alternative destinations.

18. The system of claim 17, wherein the detection apparatus of the at least one other motor vehicle comprises one or more of a navigation system, a camera, and at least one environment sensor.

19. The system of claim 17, wherein the detection apparatus at the intended location or at the respective destinations comprises one or more of a camera, an environment sensor, a parking lot occupancy sensor.

20. A motor vehicle equipped with a system of claim 16.

* * * * *